United States Patent Office 3,107,257
Patented Oct. 15, 1963

---

3,107,257
17α-(2-ALKENYL)ESTRA-1,3,5(10)-TRIENE-3,17β-DIOLS AND ESTERS THEREOF
Raymond E. Counsell, Skokie, Ill., assignor to G. D. Searle & Co., Chicago, Ill., a corporation of Delaware
No Drawing. Filed Mar. 29, 1962, Ser. No. 181,184
7 Claims. (Cl. 260—397.5)

This invention is concerned with novel steroidal compounds characterized by an unsaturated hydrocarbon radical substituted at the 17-position and, more particularly, with 17α-(2-alkenyl)estra-1,3,5(10)-triene-3,17β-diols and esters thereof. These substances can be represented by the structural formula

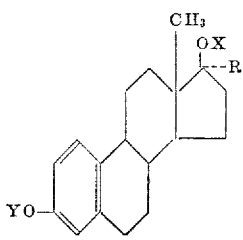

wherein X and Y can be hydrogen or a lower alkanoyl radical and R is a lower 2-alkenyl radical.

Examples of lower alkanoyl radicals represented by X and Y are formyl, acetyl, propionyl, butyryl, valeryl, caproyl, and the branched-chain isomers thereof, while the lower 2-alkenyl radicals symbolized by the R term are, typically, allyl, 2-butenyl, 2-pentenyl, 2-hexenyl, and the branched-chain radicals isomeric therewith.

The compounds of this invention can be manufactured by utilization of 3-hydroxyestra-1,3,5(10)-trien-17-one as the starting material. This substance is allowed to react with an alkenyl organometallic reagent in an organic solvent medium, and the resulting adduct is hydrolyzed, preferably in an aqueous acidic mixture, to afford the desired products. As a specific example of the processes involved, the aforementioned starting material, 3-hydroxyestra-1,3,5(10)-trien-17-one, is contacted with allyl magnesium chloride in a tetrahydrofuran-ether solvent medium, and the resulting addition product is hydrolyzed with aqueous ammonium chloride, resulting in 17α-allylestra-1,3,5(10)-triene-3,17β-diol. In place of the alkenyl magnesium halides, other organometallic reagents, such as alkenyl lithium compounds, can be substituted.

Esterification of the aforementioned 3,17β-diols with a lower alkanoic acid anhydride and pyridine affords the corresponding 3-monoesters. Typically, the instant 17α-(2-methallyl)estra-1,3,5(10)-triene-3,17β-diol is allowed to react with acetic anhydride and pyridine to yield 17α-(2-methallyl)estra-1,3,5(10)-triene-3,17β-diol 3-monoacetate.

The 3,17-diesters of the present invention are produced, however, more conveniently by contacting the aforementioned 3,17β-diols with the appropriate isopropenyl ester in the presence of an acidic catalyst. For example, 17α-allylestra-1,3,5(10)-triene-3,17β-diol, when heated with isopropenyl acetate in the presence of p-toluene-sulfonic acid, affords 17α-allylestra-1,3.5(10)-triene-3,17β - diol 3,17-diacetate.

The compounds of this invention display valuable pharmacological properties. They are hormonal agents, for example, in view of their progestational properties. Those properties are evidenced by the ability of these compounds to induce progestational proliferation of the uterine epithelium and by their ability to produce decidual changes in the uterine endometrium.

The invention will appear more fully from the examples which follow. These examples are given by way of illustration only, and it will be understood that the invention is not to be construed as limited in spirit or in scope by the details contained therein, as many modifications in materials and methods will be apparent from this disclosure to those skilled in the art. In these examples, temperatures are given in degrees Centigrade (° C.), and quantities of materials in parts by weight unless otherwise noted.

Example 1

To a slurry of 50 parts of magnesium in 133 parts of tetrahydrofuran is added dropwise with stirring, a solution of 23.5 parts of allyl chloride in 89 parts of tetrahydrofuran. A solution of 27 parts of 3-hydroxyestra-1,3,5(10)-trien-17-one in 666 parts of tetrahydrofuran containing an additional 126.9 parts of allyl chloride is then added over a period of about 3 hours to the spontaneously refluxing mixture. Refluxing is continued for about 2 hours longer, after which time the reaction mixture is cooled, and a solution of 125 parts of ammonium chloride in 500 parts of water is added with stirring. The two layers are separated and the aqueous phase is extracted with ether. This extract is combined with the original organic layer, then is washed with water, dried over anhydrous magnesium sulfate, and stripped of solvent at reduced pressure. Crystallization of the oily residue from ethyl acetate affords 17α-allylestra-1,3,5(10)-triene-3,17β-diol solvated with 0.25 molecular equivalent of ethyl acetate, M.P. about 110–112°; $[\alpha]_D = +154°$. It is represented by the structural formula

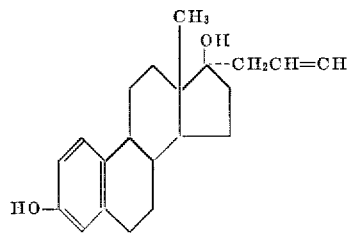

Example 2

A mixture of 2.5 parts of 17α-allylestra-1,3,5(10)-triene-3,17β-diol, 2.5 parts of acetic anhydride, and 15 parts of pyridine is stored at room temperature for about 4 hours, then is poured slowly into a mixture of ice and water. The gum which separates is isolated by decantation, then is triturated with an ice-water mixture to afford the crystalline product, which is collected by filtration, washed with water, and recrystallized from aqueous acetone, producing needle-like crystals of 17α-allylestra-1,3,5(10)-triene-3,17β-diol 3-monoacetate, M.P. about 126–128°; $[\alpha]_D = +53°$. Ultraviolet maxima are observed at 268 and 275 millimicrons with molecular extinction coefficients of 730 and 725, respectively. This substance is further characterized by the structural formula

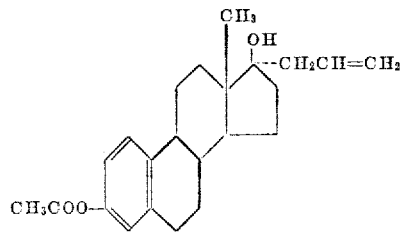

Example 3

To a slurry of 7.3 parts of magnesium in 70 parts of anhydrous ether, under nitrogen, is added a solution of 7.4 parts of 3-chloro-2-methyl-1-propene in 35 parts of anhydrous ether. A solution of 13.5 parts of 3-hydroxyestra-1,3,5(10)-trien-17-one and 10 parts of 3-chloro-2-methyl-1propene in 355 parts of tetrahydrofuran is then added dropwise with stirring at such a rate that reflux is maintained. Refluxing is continued for about 2 hours longer, and the reaction mixture is cooled, then treated with excess aqueous ammonium chloride. The resulting mixture is filtered, and the filter cake is washed with tetrahydrofuran. The organic solids are removed by distillation under reduced pressure, and the resulting residue is dissolved in benzene. That solution is chromatographed on a silica gel column, and the column is eluted with benzene, then with benzene containing increasing proportions of ethyl acetate. The 5% ethyl acetate in benzene eluate is evaporated to dryness, and the resulting residue is recrystallized from aqueous methanol to produce 17α-(2-methallyl)estra-1,3,5(10)-triene-3,17β-diol, M.P. about 164–165°. It is further characterized by an ultraviolet maximum at about 280.5 millimicrons with a molecular extinction coefficient of about 2300, and is represented by the structural formula

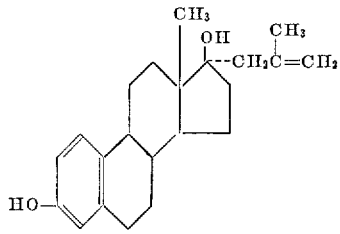

Example 4

The reaction of 2.6 parts of 17α-(2-methallyl)estra-1,3,5(10)-triene-3,17β-diol with 2.5 parts of acetic anhydride and 15 parts of pyridine by the procedure of Example 2 results in 17α-(2-methallyl)estra-1,3,5(10)-triene - 3,17β - diol 3-monoacetate. Recrystallization from acetone-heptane affords platelets of the pure material, melting at about 120–121°. Ultraviolet maxima are observed at about 268 and 275 millimicrons with molecular extinction coefficients of about 785 and 748, respectively. This substance is represented by the structural formula

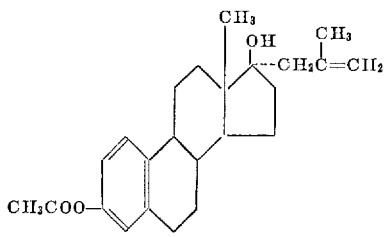

Example 5

The reaction of 2.5 parts of 17α-allylestra-1,3,5(10)-triene-3,17β-diol or 2.6 parts of 17α-(2-methallyl)estra-1,3,5(10)-triene-3,17β-diol with 2.25 parts of propionic anhydride and 15 parts of pyridine by the procedure described in Example 2 results in 17α-allylestra-1,3,5,(10)-triene-3,17β-diol 3-propionate and 17α-(2-methallyl)-estra-1,3,5(10)-triene - 3,17β - diol 3-propionate, respectively.

Example 6

A mixture of one part of 17α-allylestra-1,3,5(10)-triene-3,17β-diol, 20 parts of isopropenyl acetate, and 0.15 part of p-toluenesulfonic acid monohydrate is heated gently for aproximately 7 hours, allowing the acetone formed to distil. After cooling, ether is added to this reaction mixture, and the organic solution is washed successively with water, aqueous sodium bicarbonate, and water, then dried over anhydrous potassium carbonate containing carbon for decolorization. The resulting solution is stripped of solvent at reduced pressure to yield 17α-allyestra-1,3,5(10)-triene-3,17β-diol 3,17-diacetate of the structural formula

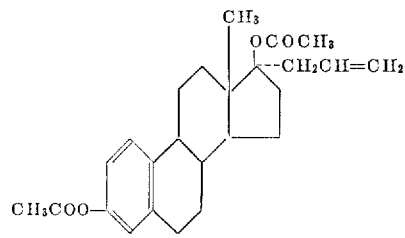

Example 7

The substitution of 1.04 parts of 17α-(2-methallyl)-estra-1,3,5(10)-triene-3,17β-diol in the procedure of Example 6 affords 17α-(2-methallyl)estra-1,3,5(10)-triene-3,17β-diol 3,17-diacetate of the structural formula

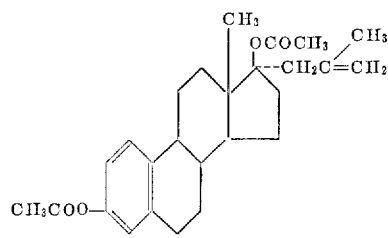

Example 8

The reaction of one part of 17α-allylestra-1,3,5(10)-triene-3,17β-diol or 1.04 parts of 17α-(2-methallyl)estra-1,3,5(10)-triene-3,17β-diol with 22.8 parts of isopropenyl propionate and 0.15 part of p-toluensulfonic acid monohydrate according to the procedure of Example 6, results in 17α-allylestra-1,3,5(10)-triene-3,17β-diol 3,17-dipropionate and 17α-(2-methallyl)estra-1,3,5(10)-triene-3, 17β-diol 3,17-dipropionate, respectively.

Example 9

To a solution of one part of 17α-allylestra-1,3,5(10)-triene-3,17β-diol 3,17-diacetate in 18 parts of methanol containing 2 parts of water is added 0.5 part of potassium carbonate, and the resulting mixture, is stirred at room temperateure for about 3 hours, then is poured slowly into a mixture of ice and water. This aqueous mixture is extracted with ether to afford an organic solution, which is dried over anhydrous sodium sulfate, and stripped of solvent at reduced pressure. The residue is recrystallized from aqueous ethanol to afford 17α-allyl-estra-1,3,5(10)-triene-3,17β-diol 17-monoacetate.

Example 10

The substitution of 1.1 parts of 17α-(2-methallyl)estra-1,3,5(10)-triene-3,17β-diol 3,17-dipropionate in the procedure of Example 9 results in 17α-(2-methallyl)-estra-1,3,5(10)-triene-3,17β-diol 17-propionate.

What is claimed is:
1. A compound of the structural formula

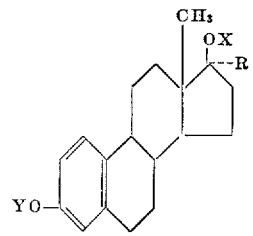

wherein X and Y are selected from the group consisting of hydrogen and lower alkanoyl radicals and R is a lower 2-alkenyl radical.

2. A compound of the structural formula

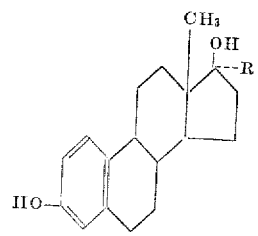

wherein R is a lower 2-alkenyl radical.

3. A compound of the structural formula

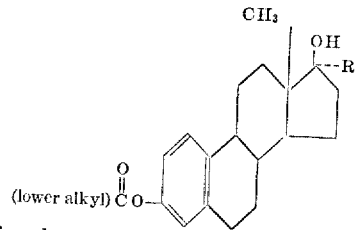

wherein R is a lower 2-alkenyl radical.

4. 17α-allylestra-1,3,5(10)-triene-3,17β-diol.
5. 17α-(2-methallyl)estra-1,3,5(10)-triene-3,17β-diol.
6. 17α-allylestra-1,3,5(10)-triene-3,17β-diol 3-acetate.
7. 17α-(2-methallyl)estra-1,3,5(10)-triene-3,17β-diol 3-acetate.

References Cited in the file of this patent

UNITED STATES PATENTS

| | | |
|---|---|---|
| 2,266,778 | Logemann et al. | Dec. 23, 1941 |
| 2,666,769 | Colton | Jan. 19, 1954 |

UNITED STATES PATENT OFFICE
CERTIFICATE OF CORRECTION

Patent No. 3,107,257                                      October 15, 1963

Raymond E. Counsell

It is hereby certified that error appears in the above numbered patent requiring correction and that the said Letters Patent should read as corrected below.

Column 3, line 7, for "methyl-1propene" read -- methyl-1-propene --; line 62, for "2.25" read -- 3.25 --.

Signed and sealed this 14th day of April 1964.

(SEAL)
Attest:
ERNEST W. SWIDER

Attesting Officer

EDWARD J. BRENNER

Commissioner of Patents